United States Patent Office 3,778,503
Patented Dec. 11, 1973

3,778,503
SODIUM TETRACYCLINE-METHYLENE-SULFA-
METHOXYPYRIDAZINE - PROPANE - SULFO-
NATE AS AN ANTIBACTERIAL AGENT
Maurice Georges Rouchy, Usine de la Claire,
Bosseval par Donchery, France
No Drawing. Filed June 30, 1970, Ser. No. 51,388
Claims priority, application France, July 1, 1969,
6922133
Int. Cl. A61k 27/00, 21/00
U.S. Cl. 424—227        1 Claim

ABSTRACT OF THE DISCLOSURE

The invention relates to new chemical compounds which are useful as drugs and a method of preparing said compounds. The new compounds are antibiotics of the tetracycline group combined with sulfonamides having free amino or free alkylamino function, the connection between the two types of base molecules being effected by means of an aldehyde bridge. The drugs have properties which are derived directly from those of the base molecules. The drugs are antibiotic, antibacterial and antiparasitic agents.

---

The present invention relates to new drugs and more particularly to antibiotic, antibacterial and antiparasitic agents which are derivatives of an antibiotic selected from the tetracycline group combined with a sulfonamide or with a closely related substance having antibacterial and free amino or free alkyl amino function, the connection between the two types of basic molecules being effected by means of an aldehyde bridge.

The new compounds of the invention correspond to the formula:

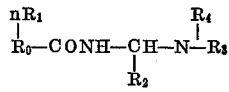

in which:

$R_0$ represents the hydroxy naphthacene skeleton of an antibiotic of the tetracycline type selected from among tetracycline itself and its derivatives such as 7-chlorotetracycline, 7-bromotetracycline, 5-oxytetracycline, 4-dedimethylamino-7-chlorotetracycline, 4 - dedimethylamino-5-oxytetracycline, 6 - desoxytetracycline, 6-desoxy-5-oxytetracycline, 6 - demethyltetracycline, 6-demethyl-7-chlorotetracycline, 6-desoxy-6-demethyltetracycline, 6 - desoxy-6-demethyl-4-dedimethylaminotetracycline, 6-methylene-5-hydroxy tetracycline, meclocycline, 7-nitrotetracycline, etc.;

$R_1$ is a solubilizing group of the type A—$SO_3B$, A—$CO_2B$, A—$SO_3H$ or A—$CO_2H$, in which A is a substituted or non-substituted straight- or branched chain or cyclic radical and B is a base such as choline, methylcholine, etc., or an alkaline or alkaline earth metal. For example, $R_1$ is a solubilizing alkyl sulfonic, arylalkyl sulfonic or alkyl carboxylic group in which the alkyl radical has from 1 to 6 carbon atoms, which group may or may not be salified by a physiologically acceptable base;

$R_1$ is preferably a basic propane sulfonate, an acid propane sulfonate, an acid or basic ortho-benzyl sulfonate, a basic ethane carboxylate or an acid ethane carboxylate, for instance a —$CH_2CH_2COOB$ or

—$CH_2CH_2CH_2SO_3B$ group in which B being as defined above, $R_1$ is attached to sodifiable OH groups or to the nitrogen atom connected to the 3 position of the tetracycline ring;

$n=0, 1, 2, 3$ or 4 depending on the number of sodifiable OH groups on the tetracycline ring, $R_0$ with preferably $n=0$ or 1;

$R_2$ is the residue of an aldehyde such as, for instance: —H, lower alkyl such as —$CH_3$,

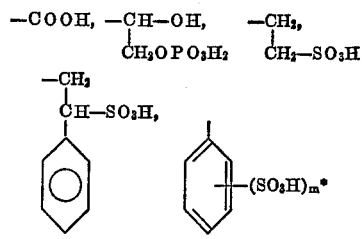

*In these last two groups the ring may possibly be substituted one or more times, particularly by alkyl or carboxyl radicals, and $m=1$ or 2.

$R_3$ is the radical of a sulfonamide after removal of the primary amino or secondary amino function. This sulfonamide is selected from among the known sulfonamides and sulfonamides bearing in $N_4$, position a solubilizing substituent as described in a French application for patent filed on Apr. 16, 1968, under Ser. No. 148,223 by the applicant entitled "New Water-Soluble Sulfonamides."

$R_3$ may be of the form:

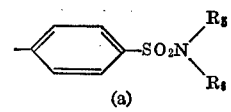
(a)

in which $R_5$ may be hydrogen, a base of an alkaline or alkaline earth metal, a radical identical to $R_6$ or as defined for $R_6$ below, an alkyl or aryl radical, a nitro, sulfo or carbonyl, thioalkyl, alkoxy, thioalkoxy heterocyclic radical, etc., and in general $R_5$ of the radicals proposed on the known sulfonamides having a therapeutic activity. In particular, $R_5$ may be a benzene, pyridine, pyridazine, pyrimidine, pyrazine, thiazole, thiodiazole, oxazole, isoxazole, phenylpyrazole, triazine, diazophenyl radical, etc., which rings may be substituted one or more times by hydroxy groups, halogens, alkyl radicals such as methyl or ethyl, alkoxy radicals such as methoxy or ethoxy, or alkyl alkoxy radicals such as methyl methoxy, methyl ethoxy, nitro, etc.;

$R_6$ is a solubilizing group of the type $R_1$, in particular A—$SO_3B$ or A—CO in which A and B have the same meaning as previously; $R_6$ may also be hydrogen, a base or an alkaline or alkaline earth metal or a lower acyl or lower alkyl group;

$R_3$ may also be of the form:

(b) 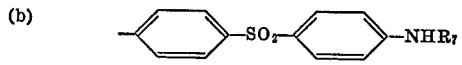

in which $R_7$ is hydrogen, an acyl radical, succinyl, maleyl or phthalyl radical or a $CH_2COOB_1$, $CH_2CH_2COOB_1$, $CH_2SO_2B_1$ or $CH_2SO_3B_1$ group and their mixtures, in which $B_1$ is a base or an alkaline or alkaline earth metal, or any solubilizng group fastened to a known sulfone, Or of the form:

(c) 

$R_7$ having the same meaning as above,

"Hetero" represents a known sulfone ring of anti-bacterial action, for instance promizole,
Or of the form:

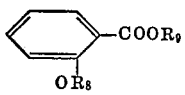

(d)

$R_8$ being hydrogen or a lower alkyl radical or is of the type $R_5$, $R_9$ being hydrogen or a lower alkyl radical or of the type $R_5$.

In the particular case of the sulfones having two amino functions, the new compounds obtained have the following structure:

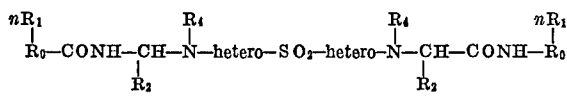

$R_0$, $R_1$, $R_2$ and $n$ having the same meaning as above and $R_4$ being as defined hereinbelow, they being identical or different, that is to say, for instance, that $n$ may be equal to 1 on the lefthand half of the molecule with any $R_1$ and may be equal to 0 for the righthand half, $R_2$ may be equal to H for the lefthand half and equal to COOH on the righthand half, $R_4$ may be $CH_3$ on the lefthand and H on the righthand half, "hetero" designating a phenyl, thiazole or other ring;

$R_4$ is hydrogen or a lower alkyl radical such as methyl, ethyl, ethyl, propyl, isopropyl, n-butyl, isobutyl, sec. butyl or tert. butyl.

The invention also covers various derivatives of the compounds satisfying the above formula, and in particular:

The internal salts of these compounds,
The physiologically acceptable salts with acids, which acids may themselves have a physiological, chemotherapeutic action of their own such as Chloramphenicol succinate, diphenyl sulfone mono- or disucinate, the succinates, maleates and phthalates of sulfonamides or sulfones, the salts of penicillic, penillamic, cephalosporanic acids, etc.,
The physiologically acceptable salts with bases, which bases may themselves have a physiological action of their own such as pyrimethamine, 4,6-diamino-1-(p-chlorophenyl)-1,2-dihydro-2,2-dimethyl-s-triazine, 4,6-diamino-1 (3,4 - dichlorophenyl)-1, 2 - dihydro - 2,2-dimethyl-s-triazine, neomycin, streptomycin, dihydrostreptomycin, chloroquinine, kanamycin, etc., choline, methyl chlorine, ethanolamines, soda, potash, magnesia, lithia, etc., erythromycin and esters thereof.

In general, the compounds in accordance with the invention may be prepared by processes similar to those which serve for the preparation of the methylene-substituted tetracyclines, as described, for instance, in French Pat. 1,267,763, the amino or alkylamino function of the sulfonamide acting as the amino function or secondary amino function of the bases and amino acids customarily used. In the following, unless otherwise indicated, the expression "tetracycline" will be used in its general sense to designate both tetracyclines and a particular one of them.

As examples of methods of preparation, the following may be mentioned:

Tetracycline itself or tetracycline substituted by groups other than on the —CO—$NH_2$ function can be reacted directly with the sulfonamide and aldehyde selected or a substance producing sulfonamide or aldehyde under the conditions of the reaction by contacting the reagents in stoichiometric proportions in a common solvent; the order of the addition of the reagents may be any desired, although it is frequently advantageous to operate in a given order.

The common solvent may be water, water modified by the addition of glycols, pure glycols, polyglycols, glycerol, light alcohols, ketones such as acetone, dimethyl sulfoxide, dimethyl formamide, dioxane, ethers, etc.

It is preferable to agitate the reaction mixture the pH of which is fixed in accordance with the specific case. The reaction is ordinarily carried out between 0 and 60° C. but the temperature is not critical.

The tetracycline can be reacted in the form of a base, the salt of an acid or of a base which does not react with aldehyde or tetracycline which has already been methylene-substituted by a radical capable of being displaced by the sulfonamide.

One can also react the aldehyde in a slight excess in a solvent as indicated above with a salt of sulfonamide tetracycline which may or may not be substituted on $N_4$ by a solubilizing radical, as previously indicated.

It is also possible to react the sulfonamide or one of its basic derivatives with the derivatives obtained by reacting one mol of aldehyde with one mol of tetracycline.

One can also react the tetracycline with an aldehyde derivative of sulfonamide, sulfone or p-aminosalicyclic acid, or else the tetracycline aldehyde with the same derivatives as above.

These products are also obtained:
Either by the action of a substance of the formula

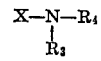

or of one of its addition salts with an acid or a base, in which formula $R_3$ and $R_4$ have the meaning given previously and X represents H or $CH_2$—$NH_2$, in the presence of bridging aldehyde or its equivalent as reagent, with a tetracycline or one of its addition salts with an acid or a base,
Or by the action of a substance of the formula

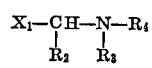

but in which $X_1$ is chloro, bromo, hydroxyl, lower alkoxy, $SO_3$, hydrosulfide, phthalimido, $SO_3B$ (for instance $NaSO_3$ or $KSO_3$), succinimido, an alkyl malonic ester radical or an acyl malonic ester radical, with a tetracycline or one of its addition salts with an acid or a base, but in the absence of aldehyde. In the malonic ester radicals, the alkyl fraction represents a straight- or branched-chain alkyl radical of 1 to 6 carbon atoms, and the acyl fraction represents a straight- or branched-chain acyl radical of 1 to 6 carbon atoms.

The above derivatives are obtained by known methods from sulfonamides.

In order to obtain the derivatives in which the sulfonamide bears in position $N_4$ a solubilizing chain as defined in the aforementioned patent application, it is possible in a first stage to obtain the derivative substituted with the base sulfonamide and introduce the solubilizing chain by methods similar to those described in the aforementioned patent application, in particular by the action of a sultone or of a lactone on the sodium derivative. As the tetracycline has other OH groups which are sodifiable by the addition of 1, 2 or 3 additional sodium molecules depending on the corresponding quantity of sultone or lactone molecules, one will obtain, for instance in the case of 2 additional sodium and sultone molecules, a sodium tetracycline dipropane sulfonate substituted by a sodium sulfonamide propane sulfonate in $N_4$ position. This type of derivative can obviously be obtained by the action of tetracycline which has been previously propane sulfonated or ethane carboxylated on its sodifiable functions, on the previously propane sulfonated or ethane carboxylated sulfonamide, or on the normal sulfonamide which is then subsequently subjected to action by propane sultone or B-propiolactone.

As a matter of fact, when propane sultone is reacted with a tetracycline salt, for instance the sodium salt or the salt of another strong base such as choline or potash, there is obtained, for instance in the case of the monosodium salt, a sodium tetracycline propane sulfonate on the first sodifiable position. If one reacts propane sultone in stoichiometric quantity with the disodium derivative of tetracycline, one obtains sodium tetracycline dipropane sulfonate substituted on the first two sodifiable functions of the tetracycline, and so on.

These soluble tetracyclines, which are themselves interesting drugs, can serve as raw materials for the obtaining of the products of the patent.

On the other hand, when propane sultone is reacted with anhydrous basic tetracycline in a common solvent, a tetracycline sulfo-betaine is obtained, which is also in itself a drug having a certain activity in vivo. As the point of attachment is the tertiary nitrogen of the tetracycline, this substance can also serve in the preparation.

The chemically well defined tetracycline derivatives in accordance with the invention are not to be confused with certain propane sultone tetracycline complexes.

The bridged tetracyclines in accordance with the invention are in general of sufficient chemical stability for it to be possible to carry out on them the reactions known for the tetracyclines, leading to the known semi-synthetic tetracyclines, to the extent that the reactions to be carried respecting the aldehyde bridge and the sulfonamide molecule.

By way of illustration and not of limitation, the reduction by zinc in the presence of choline, which gives rise to 12 a-desoxytetracyclines, and reductive dehalogenation, which permits passage from chlorotetracycline to tetracycline, are possible on the new bridged tetracyclines. Likewise, it is possible to pass from the bridged 12 a-desoxytetracyclines of the invention, by dehydration with acetic acid, to the bridged 12 a-desoxyanhydrotetracyclines, or to pass back from the bridged 12 a-desoxyanhydrotetracyclines to the corresponding bridged tetracyclines by mild oxidation.

The new molecules formed of the coupling of two large types of basic molecules by an aldehyde bridge and of the derivatives of bases or acids of these molecules have properties which derive directly from the basic molecules. Therefore, one can distinguish between several sub-groups in order to obtain a simple definition of these properties and of the applications which arise therefrom.

The UV spectra of these new substances are characteristic and permit research and determination.

It is also possible to split the new molecule by oxidative hydrolysis and to determine the amount of sulfonamide liberated by the diazotization method and the tetracycline liberated by the customary methods.

These new compounds are determined also by the bacteriological methods applicable to tetracyclines.

Derivatives of type 1

These derivatives are those in which $n=0$, $R_2$ corresponds to the general definition without being salifiable, that is to say, it is equal to H or a lower alkyl radical, etc., $R_4=H$ or a lower alkyl radical, $R_3$ and $R_5$ correspond to the general definition, $R_6=H$ or a base, an alkaline or alkaline earth metal or a lower alkyl or lower acyl radical, and $R_7=H$ or a lower acyl radical.

They are obtained by the combining of a tetracycline with a sulfonamide or a sulfone or a known paraminosalicylate. These are stable yellow powders insoluble in neutral medium but soluble in basic medium, except in the event that the sulfonamide or the sulfone is insoluble in this medium, as is the case, for instance, with sulfaguanidine, and of rather low solubility in water in acid medium, insoluble in oils, and of poor solubility in lower alcohols and ketones in the cold.

These substances will be used in particular for local treatment (skin, vagina, etc.) or intestinal treatment, and by injections in the treatment of animals.

They are of low toxicity orally because they are in general absorbed only slightly. For example, tetracycline methylene sulfaguanidine is of low absorbability and will be used for treatments in which an intestinal localization is sought with little or no blood diffusion.

Derivatives of type I bis

These derivatives are distinguished from those of type I by the fact that the aldehyde bears one or more salifiable substituents, for instance —COOH, —SO$_3$H or —PO$_3$H$_2$. When salified by sodium, potassium, chlorine, etc., they have a greater solubility in water than compounds of type I. The —COOB, —SO$_3$B, —PO$_3$(B)$_2$ group, etc., imparts to the compounds of type I an increase of the solubility in neutral medium and permits the obtaining of a new series of salts with physiologically acceptable bases having a physiological activity of their own.

Derivatives of type II

These derivatives are those for which $n=0$, $R_2$ and $R_4$ have the same definition as for derivatives of type I, $R_5$ corresponds to the general definition, $R_7$ corresponds to the general definition except that it is not hydrogen or an acyl group. $R_8$ and $R_9$ are of the type $R_6$, both on only only of them being hydrosolubilizing, and $R_6$ is a solubilizing group of type $R_1$.

In the form of salts of bases such as soda, potash, choline, etc., they are yellow powders. The solutions of yellow color are of a very definitely greater stability than the ordinary methylene-substituted tetracyclines. By the action of an acid, preferably hydrochloric acid, in theoretically calculated quantity in aqueous medium they lose their base and give rise to the internal salts foreseen in theory. These internal salts are insoluble in water, of poor solubility in glycols, light ketones, anhydrous light alcohols, even in the hot, and rather soluble in dimethyl sulfoxide, dimethyl formamide, etc. They are very stable when dry and practically insensitive to oxidation.

The derivatives of bases which are water-soluble at a pH of close to 7-7.5 permit the preparation of solutes which may be injected by all paths.

The toxicity is always less than that of the association of the basic sulfonamide and the basic tetracycline. The bacteriological activity in vivo is at least equal to the sum of the activities of the basic substances by themselves or in combination and is generally much higher and has a broader spectrum.

These derivatives of the invention are intended for general as well as local use, orally or by injection. The doses result from the doses of the initial substances. However, when 1/400 of a mol of tetracycline is administered to a human, one could except that it would be necessary to administer the same dose of the derivative corresponding to this tetracycline. Now, experience shows that despite the lesser toxicity, one obtains even better results with a 30% smaller dose. As a result of the lower toxicity and synergism, it is possible to reach germs which withstand the mixture of the initial starting substances.

Derivatives of type II bis

These substances are distinguished from those of type II by the fact that $R_2$ is the radical of an aldehyde with salifiable group, as in the case of type I bis.

The properties of these products arise directly from those of the corresponding derivatives of type II with better solubility in slightly acid and neutral medium in the case of the salified products. Their salifiable function COOH, SO$_3$H or PO$_3$H$_2$, by increasing the solubility in water, makes it possible to obtain solutes the pH of which is close to 6, which is a pH of excellent stability of the tetracyclines. These aqueous solutes are chemically more stable even than the solutes of the corresponding derivatives of type II. The solubility in acid medium is not sufficient, however, to interfere with purification by precipitation.

The biological properties are furthermore very close to those of the corresponding derivatives of type II.

Derivatives of type III

The only difference from derivatives of type II is that in this case $n=1$. Having an additional solubilizing group on the tetracycline ring, these products are therefore more soluble in water and even have substantial solubility in slightly acid medium. They also give internal salts. These are yellow powders having chemical properties close to those set forth above.

The indications and the dosaging are substantially the same as in the case of the derivatives of type II.

They are of lower toxicity than the preceding derivatives, with a decrease of the fixing in the tissues and a slightly faster elimination. It is possible to administer them to pregnant women under certain circumstances, since the teratogenic effects are decreased.

Derivatives of type III bis

As compared with derivatives of type III, the substances of this type are distinguished by the fact that the aldehyde bears a salifiable group.

The properties of the derivatives of this type derive from those of the derivatives of type III substantially as the properties of derivatives of type II bis derive from those of derivatives of type II.

Derivavties of type IV

The only difference from derivatives of type I is that in this case $n$ is equal to 1. They therefore have a better solubility in water at a pH equal to or greater than 7. The other physical and chemical characteristics are substantially the same. The uses are also local and intestinal. The injection of these substances is reserved in particular for the field of veterinary medicine.

Derivatives of type IV bis

As in the preceding cases, these derivatives are distinguished by the presence of a salifiable group on the aldheyde of the derivatives of type IV. The properties derive from those of thhe derivatives of type IV in accordance with the same laws as those which exist between the derivatives of types II and II bis.

Other types

When $n$ is greater than 1, the derivatives are more soluble in water throughout the entire pH range.

The following nonlimitative examples illustrate the preparation of a few compounds in accordance with the invention.

Example 1

To 1000 ml. of distilled water and 600 ml. of propylene glycol there are added, with agitation, one mol of anhydrous basic tetracycline, namely about 445 g. of tetracycline, and then one mol of sodium sulfamethoxypyridazine-N,I-propane sulfonate and then, while maintaining the temperature at about 45–50° C., and the pH at about 7.8 to 8.2 by addition of 5% caustic soda, one adds 1.2 mol of formaldehyde in the form, for instance, of a 37% aqueous solution; the liquid becomes clear. After total clarification, one waits for about 20 minutes, and then filters the resultant product, which should be practically clear. In this way there is obtained a solution of sodium tetracycline methylene sulfamethoxypyridazine propane sulfonate in a yield close to the theoretical.

In order to purify the above product, use is made of the property which it has of giving internal salts, the sulfone group attached to the sulfonamide attaching itself to the tertiary nitrogen of the tetracycline.

For this purpose, the mixture previously obtained is poured with vigorous agitation into 20 liters of cold distilled water (0 to 5° C.) acidified with 1.30 mol of hydrochloric acid and 0.2 mol of citric acid (a considerable number of other soluble organic and inorganic acids would also be suitable). A microcrystalline precipitate of the desired internal salt in hydrated form results. This precipitate is centrifuged and washed with cold, pure distilled water and then dried under vacuum at a temperature of about 20° C., initially and then, when the product appears almost dry, at a temperature of about 60° C., still under vacuum. A microcrystalline yellow powder of very high purity is obtained. The unreacted tetracycline, sulfonamide and formaldehyde are eliminated in acid medium in the wash waters.

In a second manner of purification, the precipitation is effected at a temperature of the liquid of more than 35° C., which causes the coagulation and the depositing of the product in the form of a pasty resin at the bottom of the vessel, which resin becomes hard and brittle upon cooling. This resin is a hydrate of the product the melting point of which, not in itself characteristic, is about 45° C.

It is possible from the above products to obtain an anhydrous form by washing in acetone and dehydrating under vacuum at a temperature of more than 90° C. The anhydrous yellow powder thus obtained has a melting point of more than 200° C. and proves to be of entirely remarkable stability. This type of purification is applicable to the very great majority of the products claimed.

Example 2

With agitation and at a temperature maintained at about 40° C., there are added to a mixture of propylene glycol (1000 ml.), dimethyl sulfoxide (800 ml.) and water (600 ml.) one mol of sodium sulfamethoxazole ethane carboxylate and then one mol of chlorotetracycline hydrochloride, namely about 515 g., followed then by a solution of caustic soda in order to bring the pH to about 7.8–8.2, namely about 44 g. expressed as pure NaOH. Thereupon 1.2 mol of formaldehyde in the form of an aqueous solution is added. The liquid clarifies itself. After clarification, it is set aside for one hour and then filtered under the vacuum of a water pump, obtaining a solution containing one mol of sodium chlorotetracycline methylene sulfamethoxazole ethane carboxylate of the following formula:

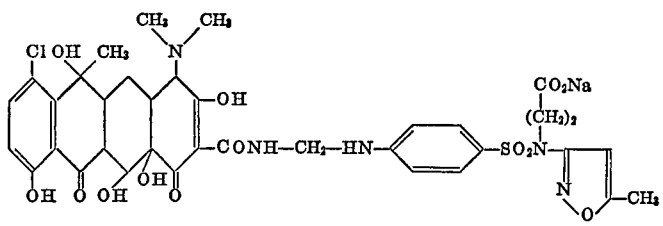

This product is purified by acid precipitation as in Example 1 to give the internal salt.

From this internal salt it is possible to pass to other salts by direct or indirect salifying.

Example 3

With agitation and at a temperature maintained at about 50° C. there are added to a mixture of propylene glycol (1000 mol), absolute ethyl alcohol (400 ml.) and pure triethylene glycol (500 ml.) one mol of anhydrous sodium 2-sulfanilamido-5-methoxypyrimidine propane sulfonate and then one mol of anhydrous basic tetracycline. After the pH has been brought to about 7.6 by addition of a small amount of soda in concentration solution, 1.10 mol of paraformaldehyde in suspension is introduced into 250 ml. of alcohol. At the end of half an hour, the reaction is in general complete, as can be noted from the solubility of the resultant mixture in water at a pH of about 7.5. There is thus obtained a solution of sodium tetracycline methylene-2-sulfanilamido - 5 - methoxypyrimidine propane sulfonate.

Purification: The solution thus obtained is poured with agitation into 10 liters of acetone +4 liters of sulfuric ether maintained at −15° C. The microcrystalline yellow precipitate is filtered, centrifuged and dried under vacuum, and constitutes the product in technically pure form. A hygroscopic product very soluble in water. The combining of the two above methods of purification makes it possible to obtain products of very high purity from materials of ordinary commercial purity and to obtain products of satisfactory purity from raw materials of more technical and therefore less expensive quality.

Example 4

With agitation and at a temperature maintained at about 45° C., there are introduced into a solution of 1200 g. of propylene glycol and 800 g. of dimethyl sulfoxide one mol of basic tetracycline and then 1.10 mol of formaldehyde in the form of a 40% alcoholic solution. The pH is brought to 7.8 10 minutes after the solubilizing of the components, 1 mol of anhydrous sodium sulfamethoxypyridazine is introduced in fractions of ⅕ each. The liquid is stirred for about 10 minutes and then set aside for 15 minutes. There is obtained about one mol of monosodium tetracycline methylene sulfamethoxypyridazine. This product is soluble in water, giving a solution of a pH of 9–10, and is insoluble in slightly acid medium, of a pH of 5–6.5, which fact can be used for its purification. The nonsodium derivative is in the form of an insoluble yellow powder.

If one mol of propane sultone is added in fractions with agitation at about 45° C. to the solution of monosodium tetracycline methylene sulfamethoxypyridazine obtained above, one obtains one mol of sodium tetracycline methylene sulfamethoxypyridazine propane sulfonate.

If the propane sultone is replaced by B-propiolacetone, there is obtained one mol of sodium tetracycline methylene sulfamethoxypyridazine ethane carboxylate, which is purified by the methods described above.

If one mol of caustic soda in the form of a 50% solution is added to the solution and this mixture reacted at 50° C. with 2 mol either of propane sultone or of B-propiolactone, then at the end of about 20 hours, and sometimes much more rapidly, one obtains either a solution of sodium tetracycline monopropane sulfonate/sodium methylene sulfamethoxypyridazine propane sulfonate or a solution of sodium tetracycline monoethane carboxylate/sodium methylene sulfamethoxypyridazine ethane carboxylate in the second case.

These products are purified by precipitation with acetone at a temperature of less than 0° C.

Example 5

With agitation and the temperature maintained at about 50° C., one mol of oxytetracycline is introduced into a mixture containing 700 ml. of water and 800 ml. of propylene glycol, and thereupon one mol of sodium sulfamido - 3 - methoxypyrazine-propane-sulfonate (obtained either by the action of propanesultone on sodium sulfamido-3-methoxypyrazine or by the action of sodium methylate in anhydrous medium on sodium sulfamido-3-chloropyrazine-propane-sulfonate, which product in its turn is obtained by the action of propane-sultone on sodium sulfonamide-3-chloropyrazine). To this solution, there is added 1.10 mol of formaldehyde in aqueous solution, and the operation is terminated as in the preceding example.

Example 6

Employing the methods of operation of the preceding examples, there are prepared the derivatives of demethylchlorotetracycline, 6-demethyl - 6 - desoxytetracycline, 6-methylenetetracycline, tetracycline, chlorotetracycline, oxytetracycline, quatrimycine, metacycline, sancycline, doxycycline, etc., and their epimers with the sulfonamides described in the aforementioned special medicament patent.

Example 7

200 ml. water, 350 ml. propylene glycol and ¼ mol of basic tetracycline are introduced one after the other into a beaker. Thereupon, ¼ mol crystalline glyoxylic acid is introduced with agitation at about 60° C. The liquid is clarified and after about ½ hour, the reaction is complete. There is obtained, in theoretical yield, the substance corresponding to the formula:

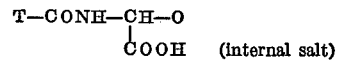
(internal salt)

in which T designates the hydroxynaphthacene skeleton of tetracycline.

Example 8

200 ml. water, 350 ml. propyleneglycol, 150 ml. dimethylsulfoxide and ¼ mol of basic chlorotetracycline are introduced one after the other in a beaker, followed by ¼ mol crystalline glyoxylic acid. After heating with agitation for 15 minutes at 70–80° C., ¼ mol sodium bicarbonate is added. The liquid becomes clarified as soon as the liberation of carbon dioide is terminated. There is obtained a solution of the compound of the formula:

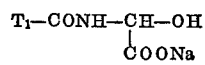

in which $T_1$ represents the chlorotetracycline ring.

Compounds similar to those of Eamples 7 and 8 are obtained in the event that the aldehyde contains a solubilizing group COOH, $SO_3H$, and their acid and bisulfite derivatives. They correspond in general to the formula:

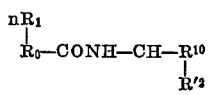

in which $n$, $R_1$, $R_0$ have the same meaning as previously; $R'^2$ = a radical of an aldehyde having one or more solifiable functions: COOM, $—SO_3M$; M=H or the cation of a base such as Na, K, etc.; $R_{10}$=OM or $SO_3M$.

By operating with bisulfite aldehydes in neutral medium, there are obtained the corresponding bisulfite derivatives which are soluble active drugs. The bisulfite derivatives are also obtained by addition of an alkaline bisulfite (in aqueous medium for instance) on the previous derivatives in which $R_{10}$=OM.

These new tetracyclines are substances the sodium potassium, and choline salts of which, etc., are soluble in water at a pH of between 7 and 8. The solutions are of a remarkable stability for this type of product. The products can be purified by precipitation in acid medium (pH about 1.5). In vivo they have the same chemotherapeutic properties as the starting tetracyclines. They are furthermore starting materials for the obtaining of certain types of bridged tetracyclines in accordance with the invention. It is sufficient in fact to cause them to react in a common solvent with the selected sulfonamide in order to obtain the desired bridged tetracycline.

Example 9

(A) Into the liquid obtained at the end of Example 7 there is introduced ¼ mol of sulfadimethoxime and it is maintained at 40° C. for 30 minutes. The transparent liquid thus obtained is poured into 5 liters of ice water containing 1/10 mol of pure hydrochloric acid. There is produced a precipitate of a compound of the formula:

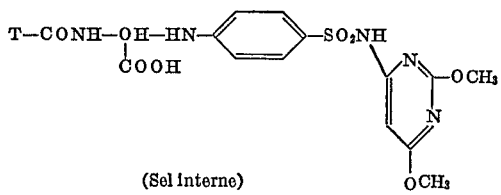

(Sel interne)

(B) By repeating the same manner of operation with the product of Example 8, one obtains the corresponding bridged chlorotetracycline.

Example 10

To a suspension of 1 mol of basic tetracycline in 800 ml. water and 300 ml. propyleneglycol, there is added 1 mol of sodium sulfamethoxypyridazine-propane-sulfonate and the temperature is brought to 40° C. Thereupon, 1 mol of sodium glyoxylate in 40% aqueous solution is introduced in fractions. The liquid becomes clarified and after 20 minutes the reaction can be considered complete.

The solution obtained is introduced into 10 liters of water maintained by ice at 0° C. and containing 2.5 mols of pure hydrochloric acid. The yellow precipitate obtained is centrifuged and dried. The product corresponds to the formula:

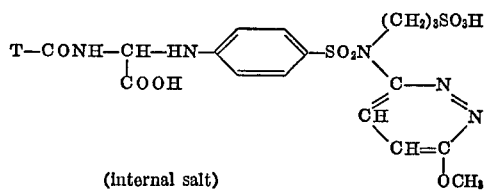

(internal salt)

Example 11

By operating in the same manner as in Example 7 but replacing the crystalline glyoxylic acid by ¼ mol of aldehyde of the formula:

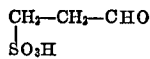

which is a product which can be prepared by known methods, one obtains the tetracycline of the formula:

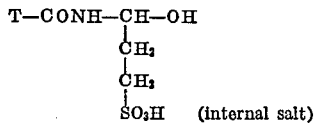

T being the tetracycline ring.

Likewise, by operating with chlorotetracycline instead of tetracycline, one obtains the corresponding product in which T is replaced by $T_1$, the chlorotetracycline ring.

Example 12

Operating in the manner set forth in Example 7, but replacing the crystalline glyoxylic acid by ¼ mol of aldehyde of the formula:

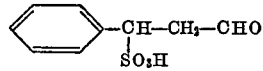

which is a product which can be prepared by known methods, there is obtained tetracycline of the formula:

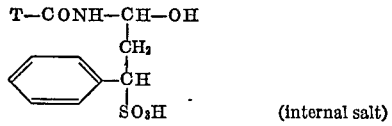

(internal salt)

Similarly, by operating with chlorotetracycline instead of tetracycline, one obtains the corresponding product in which T is replaced by $T_1$, the chlorotetracycline ring.

Example 13

By operating in the same manner as in Example 10 but replacing the sodium glyoxylate by the sodium salt of the aldehyde of Example 11 and replacing the sulfamide by sulfamethoxypyridazine, one obtains the product of the formula:

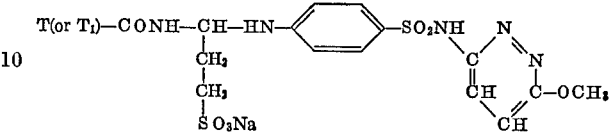

T being the tetracycline ring as in Example 10 and $T_1$ being the chlorotetracycline ring, if the latter is used in place of the basic tetracycline.

By replacing the sodium glyoxylate by the sodium salt of the aldehyde of Example 12, one obtains the corresponding product.

In this particular type of case, one can also obtain the above substances by action of the base ethylene aldehyde, for instance cinna-aldehyde, acrolein, etc., on the tetracycline-sulfonamide mixture, and then by the action of concentrated sodium bisulfite in excess in the hot on the resultant product, which furthermore corresponds to one of the types of new products of the invention.

EXPERIMENTS

Example I

Six calves fed on reconstituted milk, of an age of 15 to 20 days, and weighing 50 to 60 kg., showing an extensive diarrhea with thirst, fever and loss of weight.

The laboratory examinations show inter alia the presence of numerous pathogenic colibacilli.

A solution containing 10% sodium tetracycline-methylene-sulfamethoxypyridazine-propane-sulfonate is injected intramuscularly in a dose of 10 ml. the first day and 8 ml. on the next two days.

An improvement was noted as from the day after the first injection and the six animals can be considered completely cured 24 hours after the last injection.

Example II

Five adult rabbits of 3 kg. infected by a pathogenic staphylococcus subcutaneously and which at the end of a few days had voluminous abscesses were treated by injection of 1 ml. 8% solution of sodium tetracycline-methylene-sulfadimethoxymethane-carboxylate for 4 days intramuscularly, showed as from the second day, a liquefaction of the abscesses which, upon incision, yield a pus in an advanced stage of lysis.

Four of the animals were completely cured 48 hours after the last injection and the fifth was cured after a new series of injections employing the same doses.

Example III

Three bull calves of about 200 kg. suffering serious pulmonary attack with coughing, fever, despondency and loss of appetite. These animals were treated in a first stage with an association of chlorotetracycline plus sulfamethoxypyridazine; in this way, the animals received over 4 days 1.5 g. of chlorotetracycline per day and 10 g. of sodium sulfamethoxypyridazine intravenously.

After a temporary improvement on the first day, the condition of the animals continued to become worse. Thereupon, after all antibiotic treatment had been interrupted for 36 hours, there was established a treatment with the compound of Example 9B in 9% solution in a water/DMSo/propyleneglycol mixture, administered by deep intramuscular injection, in a dose of 35 ml. the first day and 30 ml. on the following three days.

48 hours after the first injection, the improvement in the general condition of the animals was substantial, the fever had dropped and the three bull calves were considered cured three days after the end of this second treatment.

Example IV

On an industrial pig farm, very extensive microbic infection prevailed and for this reason the animals were subjected to frequent repeated treatments with the customary antibiotics and sulfonamides; there was found such an attrition of these remedies that it was impossible to avoid illnesses and deaths.

From one lot there were selected 40 sick pigs weighing 45 to 55 kg. which pigs had already been treated but were recidivistic. This lot was divided into two groups of 20 animals each. The first group was injected with an association of 10% sodium sulfadimethoxyme plus 10% sodium sulfamethoxypyridazine in a dose of 1 ml. per 5 kg. of body weight, associated with an intramuscular injection of 5% tetracycline in a dose of 1 mil per 10 kg. of body weight.

The second lot received intramuscularly, in a dose of 1 ml. for every 10 kg. of body weight, an aqueous solution containing 5% of the compound of Example 10 in sodium form and 5% of the compound of Example 9A in the form of the sodium salt, for 4 days in the case of both lots and at the rate of one injection per day.

The results were as follows:

In the first lot, 5 animals definitely improved, 12 animals showed no change in their condition, 3 animals showed definite worsening and within one week two of the latter had died.

In the second lot, a definite cure was observed in the case of 14 animals and a very clear improvement on 5 animals, the condition of 1 animal being unchanged. All the animals of the second lot recovered subsequently.

Example V.—Tests on poultry

A lot of 500 chickens of 1.5 kg. approximately suffering from chronic respiratory ailment with colibacilli and responsible bacteria complications, of very low sensitivity to different antibiotics (after isolation and in vitro resistance tests) was divided into two equal lots. One of the lots was treated intramuscularly with a dose of 0.5 ml. per kg. of body weight in a single injection while the other lot was treated orally, in drinking water, in a dose of 0.5 ml. per kg. of body weight for four days.

The treatment solution had the following formula:

sodium chlorotetracycline-methylene-sulfamonomethyloxyme-ethane-carboxylate: 2%,
sodium tetracycline-methylene-sulfamethoxypyrazine-propane sulfonate: 1%,
sodium oxytetracycline-methylene-sulfa-5-methyl-pyrimidine-propane-sulfonate: 2%,
sodium tetracycline-methylene-sulfamethoxazole-propane-sulfonate: 2%,
sodium tetracycline-methylene-sulfadiazine-ethane-carboxylate: 3%.

In the case of the first lot, there were obtained 91% definite cures and 8% improvements, and in the case of the second lot, 72% cures and 17% very clear improvements with a total stopping of the deaths.

What is claimed is:
1. A pharmaceutical composition comprising an antibacterially effective amount of sodium tetracycline-methylene-sulfamethoxypyridazine-propane-sulfonate in a pharmaceutically acceptable carrier.

References Cited
UNITED STATES PATENTS 3,275,652   9/1966   Martell et al. _____ 424—228
3,018,221   1/1962   Millar et al. _____ 424—228

ALBERT T. MEYERS, Primary Examiner
V. D. TURNER, Assistant Examiner

U.S. Cl. X.R.
260—239.6, 239.7, 239.75, 239.9, 559 AT